UNITED STATES PATENT OFFICE.

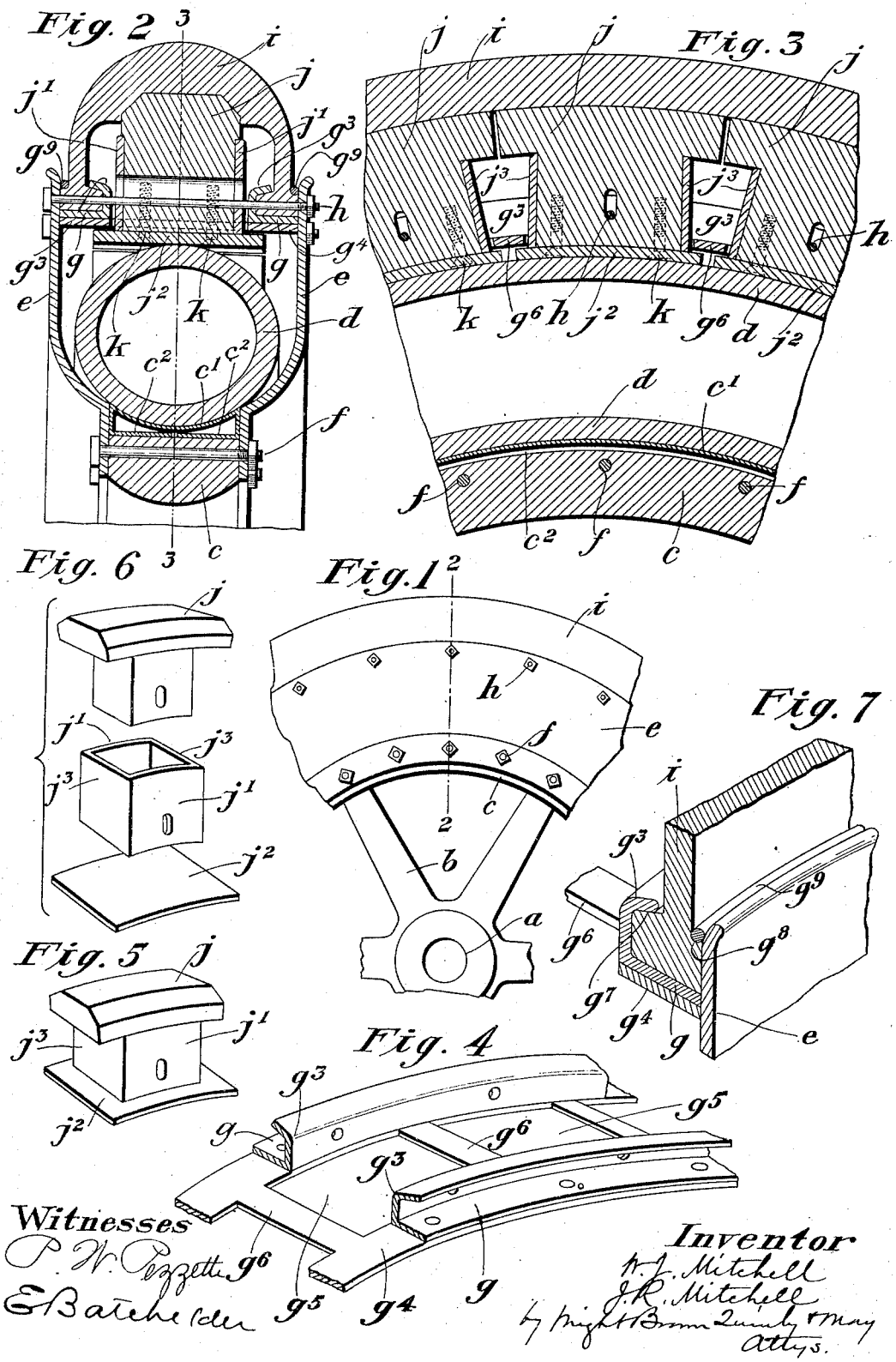

WINFIELD J. MITCHELL, OF PITTSFIELD, NEW HAMPSHIRE, AND JAMES R. MITCHELL, OF TEMPLETON, MASSACHUSETTS, ASSIGNORS TO MITCHELL PUNCTURELESS PNEUMATIC TIRE COMPANY, OF SWAMPSCOTT, MASSACHUSETTS, A CORPORATION OF MASSACHUSETTS.

VEHICLE-WHEEL.

No. 868,611.  Specification of Letters Patent.  Patented Oct. 15, 1907.

Application filed November 14, 1906. Serial No. 343,446.

*To all whom it may concern:*

Be it known that we, WINFIELD J. MITCHELL, of Pittsfield, in the county of Merrimack and State of New Hampshire, and JAMES R. MITCHELL, of Templeton, in the county of Worcester and State of Massachusetts, respectively, have invented certain new and useful Improvements in Vehicle-Wheels, of which the following is a specification.

This invention relates to wheels for motor vehicles and the like, the wheel having a tread or tire adapted to yield independently of the body of the wheel.

The invention relates particularly to a wheel having a rigid felly provided at its sides with outwardly-projecting rigid flanges forming the sides of a deep recess, said felly and flanges constituting a chambered or recessed rigid body, an air tube located in the recess of said body, and protected by the sides and bottom thereof, two outer annular seats rigidly affixed to the body, and separated by an intermediate space, a tread portion or tire engaged with and supported by said outer seats, and U shaped in cross section, and a series of leg sections detachably seated in the tire, and projecting between the outer seats, said leg sections bearing on the air tube so that the leg sections and the main portion of the tire bearing thereon, are yieldingly supported by the air tube, and are adapted to move toward and from the center of the wheel, the leg sections sliding in and out in the leg-receiving space between the outer seats.

The present invention has for its object to provide certain improvements in the construction of parts of the wheel, said improvements looking to economy of construction and decreased weight.

The invention also has for its object to provide certain improved means for securing the tread portion or tire to the outer seats and to the side flanges on the wheel body.

The invention consists in the improvements which we will now proceed to describe and claim.

Of the accompanying drawings, forming a part of this specification,—Figure 1 represents a side elevation of a portion of a vehicle wheel embodying our invention. Fig. 2 represents a section on line 2—2 of Fig. 1. Fig. 3 represents a section on line 3—3 of Fig. 2. Fig. 4 represents a perspective view showing portions of the two outer seats and a portion of the annular spacing member attached thereto. Fig. 5 represents a perspective view of one of the leg sections. Fig. 6 represents in perspective the parts of the leg section separated from each other. Fig. 7 represents a fragmentary view showing the improved means for securing the base portions of the outer tire to the outer seats and the side flanges of the wheel body.

The same letters of reference indicate the same parts in all the figures.

In the drawings, $a$ represents the hub, $b$ the spokes and $c$ the felly of a vehicle wheel. The outer surface of the felly $c$ has an inner seat which supports an air tube $d$ of any suitable construction. The said seat is preferably a hollow sheet metal ring having a transversely concave outer face $c'$ composed of the central part of a sheet metal strip, and a back composed of the edge portions $c^2 c^2$ of the strip bent under the portion $c'$.

$e\ e$ represent flanges or side plates rigidly attached to the felly $c$ by bolts $f$, and projecting outwardly from the felly at opposite sides of the air tube. The felly and the flanges constitute a rigid chambered or recessed wheel body.

$g\ g$ represent two outer seats which are annular sheet metal bands or rings attached to the side plates $e\ e$ by bolts $h$, and provided with hooked flanges $g^3$. The outer seats are spaced or held apart from each other by a sheet metal spacing member $g^4$ riveted to the outer seats $g$, and provided with a series of leg-receiving openings $g^5$ which are separated from each other by transverse bars $g^6$.

The leg sections extend through the leg-receiving openings $g^5$, and are adapted to slide inwardly and outwardly in said openings between the outer seats. Each leg section is composed of a body portion $j$ of elastic material, such as rubber, metallic wear pieces $j'$ applied to the sides of the body $j$ below the enlarged head portion thereof, and a facing strip $j^2$ on the inner surface of the body $j$, said facing strip having an antifrictional surface adapted to bear upon the air tube $d$ with the minimum friction. The wear pieces $j'$ are preferably the sides of a box having two connecting sides $j^3$, as shown in Fig. 6. They may be made of any suitable material, preferably aluminium on account of lightness. The said wear pieces sustain all wear resulting from contact between the leg sections and the inner seats and the spacing pieces $g^6$ so that there is no possibility of wear or chafing of the rubber bodies $j$. The wear pieces also reduce to the minimum the frictional resistance to the inward and outward movements of the leg sections. The ends of the outer or head portion of the rubber body overhang the connecting sides $j^3$ so that when the leg sections are abutted together, end to end, as shown in Fig. 3, recesses are formed between them for the reception of the space bars $g^6$. The said space bars constitute stop members which prevent endwise creeping of the leg sections and tire. The wear pieces $j^3$ prevent the chafing and wear that would result from contact of the rubber bodies of the leg sections with the space bars. The anti-frictional facing strip $j^2$ is preferably a piece of sole leather arranged with its grain surface outward or in contact with the air tube. This grain surface is susceptible of a high polish so that it prevents any injurious chafing of the air tube. The strip $j^2$ is preferably attached to the body portion $j$ of the leg section by screws or other fastening devices $k$.

It will be seen that the employment of sheet metal as the material of the inner and outer seats and of the spacing member $g^4$ reduces to the minimum the weight of the wheel and the cost of manufacturing. The sheet metal employed will, of course, be of suitable thickness to insure the requisite degree of strength.

Each of the base portions of the tire $i$ is thickened to form an inner shoulder $g^7$ engaged with the hooked flange $g^3$, and an outer shoulder $g^8$ which is slightly below the outer edge of the side plate $e$. $g^9$ represents a wire ring which is seated on the shoulder $g^8$, and has a diameter less than that of the side plate $e$, so that the said ring is interposed between the outer side of the tire base and the side plate $e$, and is retained in place by the latter, as shown in Figs. 2 and 7. The rings $g^9$ are applied to the bases of the tire before the tire is applied to the wheel, the preferred procedure being to attach one of the side plates $e$, then locate the tire bases with their rings $g^9$ in place on the outer seats, and then attach the other side plate $e$. The tire bases are thus so securely attached that they cannot be displaced.

I claim:

1. A vehicle wheel comprising a chambered rigid body having an inner seat, a pneumatic cushion bearing thereon, two outer seats, an annular spacing member formed independently of the outer seats, and rigidly attached thereto, said spacing member having leg-receiving openings between the outer seats, an elastic tire U shaped in cross section, and having base portions permanently bearing on the outer seats, and leg sections bearing on the pneumatic cushion and on the elastic tire, and movable in said openings.

2. A vehicle wheel comprising a chambered rigid body having an inner seat, a pneumatic cushion bearing thereon, two sheet metal outer seats, an annular sheet metal spacing member formed independently of the outer seats, and riveted thereto, said spacing member having leg-receiving openings, an elastic tire U shaped in cross section, and having base portions permanently bearing on the outer seats, and a series of leg sections bearing on the pneumatic cushion and on the elastic tire, and movable in said openings.

3. A vehicle wheel comprising a rigid felly, a hollow sheet metal inner seat bearing on said felly, and having a concave outer face, a pneumatic cushion bearing on said seat, side plates or flanges secured to the felly at opposite sides of the cushion, two sheet metal outer seats, an annular sheet metal spacing member affixed to the outer seats, and having leg-receiving openings, an elastic tire U shaped in cross section, and having base portions permanently bearing on the outer seats, and a series of leg sections bearings on the pneumatic cushion and on the elastic tire, and movable in said openings.

4. A vehicle wheel comprising a rigid felly having an inner seat, a pneumatic cushion bearing on said seat, side plates or flanges secured to the felly at opposite sides of the seat, two outer seats separated by a leg-receiving space, and affixed rigidly to the outer portions of the side plates, said seats having hooked flanges which overhang the seats, an elastic tire U shaped in cross section, and having base portions bearing on the outer seats, and engaged with the hooked flanges thereon, the outer sides of said base portions having shoulders, annular confining rings interposed between the outer sides of the said base portions and the side plates, and engaged with the said shoulders, and leg sections bearing on the said pneumatic cushion and tire, and movable in said space.

In testimony whereof we have affixed our signatures, in presence of two witnesses.

WINFIELD J. MITCHELL.
JAMES R. MITCHELL.

Witnesses as to signature of Winfield J. Mitchell:
MAYLAND P. FOSS,
A. E. JENKINS.

Witnesses as to signature of James R. Mitchell:
E. BATCHELDER,
P. W. PIZZETTI.